United States Patent [19]

Evans et al.

[11] 3,741,752

[45] June 26, 1973

[54] ACID LEACHING PROCESS FOR TREATING HIGH GRADE NICKEL-COPPER MATTES

[75] Inventors: David John Ivor Evans, North Edmonton, Alberta; Herbert Veltman; Patrick T. O'Kane, both of Fort Saskatchewan, Alberta, all of Canada

[73] Assignee: Sherritt Gordon Mines Limited, Toronto, Ontario, Canada

[22] Filed: Jan. 22, 1971

[21] Appl. No.: 108,905

[52] U.S. Cl. .................. 75/101, 75/117, 75/119, 423/41, 423/150
[51] Int. Cl. .................. C22b 15/08, C22b 23/04
[58] Field of Search .................. 75/101, 115, 117, 75/119; 23/117, 125; 208/108, 112

[56] References Cited
UNITED STATES PATENTS

| | | | |
|---|---|---|---|
| 3,293,027 | 12/1966 | Mackiw et al. | 75/119 |
| 3,616,331 | 6/1969 | O'Neill et al. | 204/108 |
| 1,770,866 | 7/1930 | Smith | 75/101 |
| 967,072 | 8/1910 | Shuler | 23/117 |
| 3,322,532 | 5/1967 | Wieder et al. | 75/117 |
| 2,934,428 | 4/1960 | Donaldson | 75/119 X |
| 1,890,934 | 12/1932 | Carson | 23/117 |
| 3,652,265 | 3/1972 | Marschik et al. | 75/117 |

*Primary Examiner*—G. O. Peters
*Attorney*—Frank I. Piper and Arne I. Fors

[57] ABSTRACT

Nickel and copper values are separately recovered from copper-nickel-sulphide matte by means of a multi-stage acid leach process. The matte is treated in a first leaching stage in which the acid to acid-reactive metals molar ratio and leaching time are controlled to selectively extract the bulk of the nickel values while the copper values remain in the leach residue. The residue containing copper values and a minor portion of the nickel values is then acid leached in one or more stages to substantially completely extract copper values and the residual nickel values. Precious metal contained in the matte are concentrated in the residue from the secondary leaching stages. Copper is recovered from the solution from the secondary leaching stages and the spent solution containing one mole of acid per mole of copper recovered is recycled as required to the first leaching stage to maintain the desired sulphur balance in that stage.

9 Claims, 1 Drawing Figure

Patented June 26, 1973 3,741,752
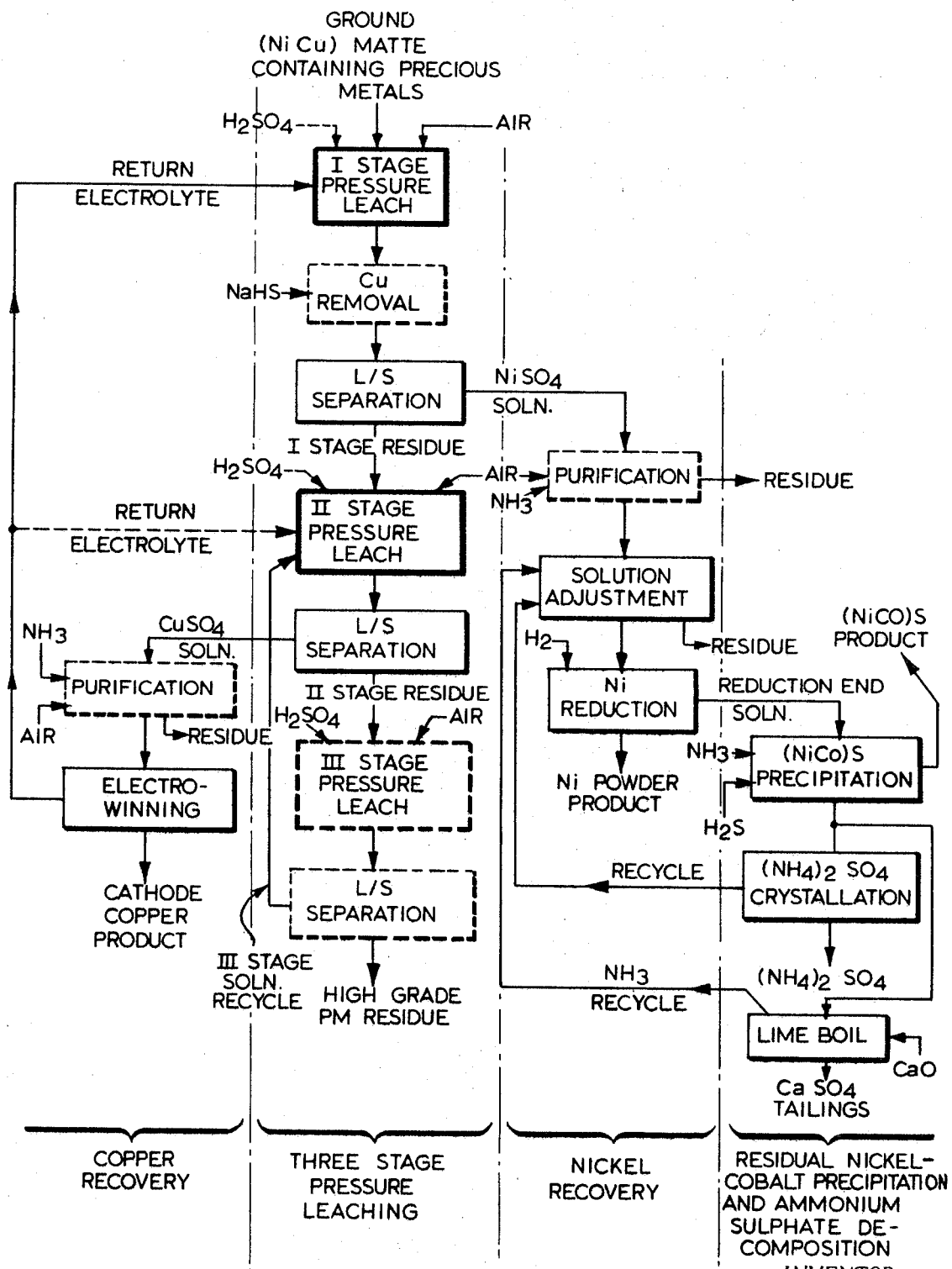
INVENTOR.
DAVID J. I. EVANS
HERBERT VELTMAN
BY PATRICK T. O'KANE
Agent

ACID LEACHING PROCESS FOR TREATING HIGH GRADE NICKEL-COPPER MATTES

The present invention relates to a process for treating nickel-copper-sulphide mattes for the recovery of copper and nickel values therefrom. More particularly, the invention relates to a multi-stage hydrometallurgical acid leaching process for the separate recovery of copper and nickel values from mattes containing substantial amounts of such values. The invention also relates, in accordance with a particularly important feature thereof, to the recovery of copper and nickel values from a high grade matte additionally containing significant amounts or precious metals such as platinum and palladium and in which process such precious metals are obtained in relatively high concentrations in a final leaching stage residue.

The term "matte" is generally understood to apply to the impure, semi-metallic products of the smelting of non-ferruginous metal sulphide ores and concentrates, of non-ferruginous metal oxide ores and concentrates to which sulphur or sulphidic minerals are added for smelting or of non-ferruginous metal scrap to which sulphur or sulphide minerals are added in a melting operation. As such, mattes may have a wide range of compositions. However, the present invention is principally concerned with the treatment of mattes containing relatively high proportions of both nickel and copper. The mattes may also contain lesser amounts of other metals, including precious metals, as will be explained in greater detail as the description herein proceeds.

Various methods are known and have been proposed for treating such mattes for the separate recovery of copper and nickel therefrom. Such methods include pyrometallurgical processes, such as further smelting with various fluxes to purify the matte to a state where final refining may be carried out by electrochemical methods and hydrometallurgical processes involving leaching in basic or acidic media, solution purification and metals recovery operations.

Numerous hydrometallurgical processes for the treatment of mattes have been developed in recent years. These methods possess certain advantages over the older conventional smelting processes. For example, hydrometallurgical processes are generally very flexible and permit treatment of multi-constituent mattes containing a variety of valuable metals for the separate recovery of each of the contained metals.

Previously proposed hydrometallurgical processes for the recovery of nickel and copper values from high grade nickel-copper-sulphide mattes have generally involved leaching of the matte to extract substantially all nickel and copper values to produce a leach solution which contains concentrations of both nickel and copper followed by treatment of the solution for the separate recovery of the nickel and copper values. A problem which these processes is that in order to recover the nickel values as pure product metal, the copper must first be substantially completely removed from the solution. While there are numerous methods available for this purpose, such as cementation, precitation with a soluble sulphide and solvent extraction, for example, all are subject to various technical, operating and economic problems which adversely affect the overall economics of the processes, particularly where relatively large amounts of copper must be removed from solution.

According to the present invention the major portion of the nickel values are preferentially extracted from the matte in a first stage acid oxidation leach which is conducted to product a solution which contains a substantial amount of dissolved nickel and little or no dissolved copper. This solution may be passed directly to a nickel recovery operation or, if necessary, may first be subjected to a very simple copper removal step to remove any small amount of copper it may contain.

The residue from the first stage leach, which contains substantially all the copper values as well as the nickel values not extracted in the first stage leach is treated in a second stage acid oxidation leach which is conducted to extract substantially all the copper values therefrom as well as the residual nickel values. Provided the weight ratio of nickel to copper in the matte is no more than about 2.5 and the major portion of the nickel is extracted in the first stage leach, the amount of nickel in the second stage solution is sufficiently low to permit the second stage leach solution to be passed to a copper recovery stage without first removing the nickel from the solution. Copper is recovered for example by electrowinning, with concurrent regeneration of sulphuric acid, and the spent solution from such copper recovery operation, which contains the nickel extracted in the second stage leach as well as the regenerated sulphuric acid and residual copper values, is recycled to the first leaching stage or partly to the first and partly to the second leaching stage.

Thus, according to the present invention, recovery and separation of copper and nickel values is obtained, firstly by controlling the first stage acid oxidation leach such that an effective separation of the bulk of the nickel from the copper is obtained in the leaching operation itself, and secondly, by ensuring that the relatively copper and nickel concentrations in the first stage leach residue are such that this residue can be leached to produce a second stage leach solution from which the copper can be removed directly in metallic form without first removing the nickel from the solution. The first requirement is met by controlling the total sulphur content of the first stage leach slurry such that there is about 1 mole of sulphur for each mole of nickel plus copper in the slurry and by terminating the first stage leach while a minor portion of the nickel content of the slurry remains unleached. The second requirement is met by providing a feed matte in which the Ni/Cu weight ratio does not exceed 2.5. In thus way, as long as the major portion of the nickel, e.g., 70 percent or more is extracted in the first leaching stage, the residual nickel content of the first stage leach residue and, substantially, the nickel content of the second stage leach solution will not exceed the limits which will permit effective separation of copper and nickel in the copper recovery step. Recycle of at least a part of the spent solution from the copper recovery step to the first stage leach permits close control of sulphur level in the first stage leach and, also, ensures that there is no build-up of nickel in the copper recovery circuit.

More specifically, the present invention can be defined as comprising the steps of:

a. providing as feed material a nickel-copper-sulphide matte having a nickel:copper weigh ratio up to about 2.5 and a sulphur content of less than 1 mole per mole of total acid reactive metals contained in the matte;

b. forming an aqueous slurry of said matte in finely divided form;

c. reacting said slurry in a first leaching stage under oxidizing conditions at a temperature above about 210°F.

d. continuing said first leaching stage to effect preferential extraction of a major portion of the nickel values contained in said matte but terminating said first leach stage while a minor portion of said nickel values remain unextracted to provide a first stage leach solution containing a relatively high concentration of dissolved nickel and a first stage leach residue containing undissolved copper and nickel values;

e. separating said first stage leach solution from said first stage leach residue;

f. reacting said first stage leach residue in a second leaching stage at a temperature above about 210°F. under oxidizing conditions with an aqueous solution containing sufficient sulphur values to combine as sulphates with substantially all copper and nickel values contained therein to provide a second stage leach solution containing a relatively high concentration of dissolved copper values and a relatively low concentration of dissolved nickel values and a second stage leach residue;

g. recovering dissolved copper values from said second stage leach solution in a copper-winning step whilst simultaneously generating sulphuric acid to provide a spent solution containing sulphuric acid, dissolved nickel values and residual dissolved copper values; and h. recycling sufficient of said spend solution from said copper-winning step to said first leaching stage to adjust the total sulphur content of said slurry such that there is about 1 mole of sulphur in said slurry to each mole of nickel plus copper.

The further details and features of the process of this invention are described hereinafter with reference to the accompanying drawing which is a schematic flowsheet illustrating the incorporation of the process of this invention in an overall integrated process for recovery of copper and nickel values from a high grade nickel-copper-sulphide matte additionally containing iron and arsenic as impurities and significant proportions of precious metals such as platinum group metals.

Referring to the drawing, it should first be noted that the process illustrated, as already indicated herein, primarily is applicable to the recovery of nickel and copper values and a precious metals-containing residue from a high grade nickel-copper-sulphide matte containing, in addition to nickel, copper and precious metals, iron and arsenic as impurities which need to be removed from the various leach solutions for the purpose of ensuring low levels of such impurities in the copper and nickel products.

As will be explained in greater detail hereinafter, several of the operating steps shown in the flow sheet of the drawing are optional and their utilization will depend on the nature of the mate being treated in any specific case. For example, in the event that impurities such as iron and arsenic are present in the matte to a smaller extent or are absent therefrom or if less pure products are acceptable, the optional impurity-removal stage shown in broken lines may well be omitted. Similarly, in the event that a final leach residue having a high concentration of precious metals is not desired, the third leaching stage shown in the drawing may also be unnecessary.

Bearing the aforesaid provisos in mind, the process depicted by the flowsheet of the drawing will now be described in greater detail.

In the illustrated flowsheet, a finely divided high grade nickel-copper-sulphide matte also containing significant amounts of cobalt and precious metals such as platinum and palladium as well as iron and arsenic impurities is fed to a first leaching stage in which it is leached to provide a first stage leach slurry rich in dissolved nickel and containing only a very small amount of dissolved copper. This first stage leaching operation preferably is effected initially under oxidizing conditions and, finally, under non-oxidizing conditions as will be explained in greater detail hereinafter.

The process is applicable only to nickel-copper mattes containing relatively large proportions of both nickel and copper and in which the weight ratio of nickel to copper is less than about 2.5. The process is especially well adapted for treatment of mattes in which the Ni/Cu weight ratio is between about 1.5 and 2.0. Although, theoretically, there is no lower limit for the nickel to copper weight ratio, mattes treatable in accordance with the process of this invention, it will be more generally applicable to mattes having a Ni/Cu weight ratio greater than 0.3.

The matte must contain less than 1 mole of sulphur for each mole of contained nickel, copper and other acid reactive metals such as iron and cobalt capable of forming metal sulphates under the leaching conditions. If the matte contains more than 1 mole of sulphur per mole of such metals, excess acid will be produced in the first stage leach, with resulting low pH and decreased selectivity of nickel extraction relative to copper. Preferred mattes for treatment according to the invention contain from about 0.5 to about 0.8 mole of sulphur per mole of nickel plus copper. With such mattes, the deficiency in total sulphur requirements for the first stage leach is conveniently made up from recycled spent solution from the copper electrowinning step. This permits close control of total sulphur content in the first stage leach and, also, provides a bleed for nickel from the copper recovery circuit.

The first stage leach is conducted at a temperature above about 210°F. preferably between about 270°F. and 300°F. and, during the oxidizing stage thereof, under an oxygen overpressure of about 10 psig and more preferably, at least about 20 psig.

During the first leaching stage of the process, the nickel values present in the matte are preferentially leached by reaction with any copper sulphate present in the spent solution recycled from the electrowinning stage and by the sulphuric acid present in the spent electrolyte and formed during the leaching reaction or added as such to the first leaching stage. Improved selectivity of nickel extraction relative to copper is obtained by conducting the latter stages of the first stage leach in the absence of oxygen.

If the first stage leach were conducted within the indicated temperature range in the presence of oxygen and sufficient sulphur to combine with the copper as well as the nickel so as to extract substantially all nickel values, considerable quantities of copper would be dissolved along with the nickel. However, according to the invention, the first stage leach operation is controlled to ensure that while a major portion, i.e., 70 percent or more of the nickel is extracted, a minor portion, e.g., at least about 3 percent and preferably about 10–20 percent of the nickel content of the matte remains unextracted. As long as the unleached nickel values are present in the slurry, any copper values which are extracted will be replaced in solution by nickel as a result of reaction between the dissolved copper and the unleached nickel values. This is particularly so where non-oxidizing conditions and a pH of about 4 is maintained.

The first stage leaching operation preferably is continued under oxidizing conditions until at least about 70 percent and preferably between about 80 and 90 percent of the nickel values are extracted. The first stage leach is then continued in the absence of oxygen and at an elevated temperature, preferably in the range of 270–300°F., to ensure the maximum possible replacement of dissolved copper by nickel. The major portion, that is, 70 percent or more, and in most cases between 80 and 90 percent of the nickel is extracted in the first leaching stage with a leaching time of about 1–3 hours. Since the extracted nickel values are dissolved in the solution as $NiSO_4$, each mole of nickel extracted will require 1 mole of sulphur as $SO_4^{--}$. The $SO_4^{--}$ requirements for the first leaching stage will originate in part from the oxidation of the sulphur content of the matte, in part, from the return electrolyte from the copper electrowinning stage and, if necessary, in part as fresh sulphuric acid added directly to the first leaching stage. Once leaching is under way, the acid requirement for the first stage can be met by the oxidation of the sulphur in the matte and the recycle of solution from the copper recovery step. To optimize the selectivity of nickel extraction, preferably the amount of solution recycled is regulated to control the final pH in the first stage leach in the range of about 2.5 – 5.0, preferably between 3.5 – 4.5

Before passing to a liquid-solid separation operation, the first stage leach end slurry may optionally be treated with a soluble sulphide such as NaHS or $H_2S$ for the purpose of precipitating any small amount of dissolved copper that may be in solution.

After separation of undissolved solids, the nickel-rich and copper-free first stage leach solution may be treated by any suitable method for the recovery of substantially pure nickel therefrom. In the scheme illustrated in the drawing, the solution may be first treated in an optional iron-arsenic removal stage, shown in broken lines, in which the solution is treated with ammonia and sparged with air to precipitate iron and arsenic. The solution is next treated in a solution adjustment step in which ammonia and ammonium sulphate contents are adjusted to within the limits required in accordance with conventional practice for the subsequent direct hydrogen reduction step in which the nickel in solution is reduced with hydrogen under pressure and precipitated as nickel powder product which is recovered from the spent liquor by a suitable liquids-solids separation stage.

The manner in which the spent liquor from the nickel reduction stage is treated to recover residual nickel and cobalt values remaining therein and for the regeneration of ammonia for use in the aforementioned iron-arsenic removal and solution adjustment stages will be described briefly at a later point herein since, like the direct nickel reduction step, such treatment stages do not form an essential part of the present invention.

After separation from the first stage leach solution, the copper-rich first stage leach residue still contains a significant amount of non-extracted nickel as well as substantially all the copper content of the matte. This residue is passed to a second leach stage in which it is further leached with sulphuric acid solution under oxidizing conditions to provide a second stage leach solution containing a high concentration of copper and a lower but significant concentration of nickel and a second stage leach residue containing all the precious metals and residual amounts of nickel and copper.

The second leaching stage is conducted with a total sulphur (dissolved and undissolved) to total non-ferrous metals molar ratio of at least about 1:1 and preferably about 1.05:1. In this stage, also, the sulphur requirements will be made up from sulphur contained in the residue, sulphur dissolved in the solution recycled from the copper winning operation as $CuSO_4$, $NiSO_4$ and free $H_2SO_4$ and sulphur added as $H_2SO_4$. The amount of sulphuric acid added in the second leaching stage will depend primarily on the sulphur content of the matte. The added acid plus the sulphur values in the residue plus sulphur values in the solution must be sufficient to satisfy the stoichiometric requirements of all the acid reactive metals as metal sulphides, as well as to compensate for any mechanical losses.

The second stage leach is conducted at a temperature within the range of from about 210°F. to about 300°F., preferably about 270°F. and 300°F. under oxygen overpressure of at least about 15 p.s.i.g. Final pH values are within the range of from about 1.0 to about 2.5.

The severity of the conditions adopted for the second leaching stage will depend on numerous factors, for example, according to whether or not further leaching stages such as the third leaching stage shown in the drawing are adopted and on the extent to which it is economically desired to remove all the acid soluble metal values from the first stage leach residue. In the event that the matte being leached also contains precious metal values, it is desirable to effect the greatest possible extraction of acid soluble metal values from the first stage leach residue in the second and in any subsequent leaching stages to provide a final leach residue having the highest possible concentration of such precious metals. Normally, the second stage leach will be operated under such conditions as to provide extraction of at least about 96 percent by weight of the copper values in the first stage leach residue and extraction of at least about 99 percent by weight of the nickel values in the first stage leach residue.

In order to provide a final residue containing the highest possible proportions of the precious metals, the second stage leach residue may optionally be passed to a third leaching stage in which it is further leached with sulphuric acid solution under more severe oxidizing acid conditions to provide a third stage leach solution which, after separation from the third stage leach residue, may be recycled to the second leaching stage. The third stage leach residue contains essentially all the precious metals in relatively high concentrations and such precious metals can be recovered from that residue by any conventional methods.

The second stage leach solution having the third stage leach solution combined therewith passes to an impurity precipitation stage in which the solution is treated with an alkali, for example, an aqueous sodium carbonate or ammonia solution, and sparged with air to precipitate iron, arsenic and other impurities such as selenium, if present. The resulting precipitate is separated from the solution and the purified copper rich solution is next passed to the copper-winning step in which copper is recovered in metallic form by conventional electrowinning which results in the recovery of elemental copper and regeneration of 1 mole of sulphuric acid for each mole of copper recovered. As an alternative, copper could be recovered by direct reduction to copper powder by reaction with hydrogen. In this case, also, the end solution will contain 1 mole of acid for each mole of copper recovered.

The spent solution from the copper-winning stage containing dissolved nickel, non-recovered dissolved copper and the sulphuric acid generated during such copper-winning operation is recycled at least in part to the first leaching stage. The amount of spent solution recycled to the first leaching stage must be sufficient both to prevent build up of nickel concentration in the solution supplied to the copper recovery operation and to ensure that sufficient sulphur is available in the first leaching stage slurry to satisfy both the requirements of the extracted nickel values as $NiSO_4$ and the requirements of the copper content of the matte as $CuS$. In order to minimize dissolution of copper values in the first stage leach, preferably the flow of return electrolyte is carefully regulated to maintain the pH in the latter stages of the first stage leach at about 4. Where only a portion of the spent electrolyte from the copper-electrowinning stage is recycled to the first leaching stage, the balance may be recycled to the second leaching stage as shown by the broken line in the drawing.

Referring now briefly to the process steps usefully applied for the recovery of the nickel and cobalt remaining in the spent liquor from the nickel reduction stage, it will be seen from the drawing that liquor is shown as being treated with ammonia for pH adjustment and sodium hydrosulphide, hydrogen sulphide or ammonium sulphide so as to precipitate nickel and cobalt values. The resulting mixed precipitate, after separation by filtration, can be treated in any appropriate manner to recover nickel and cobalt therefrom. The liquid, after such separation, passes in part to a crystallization stage in which ammonium sulphate is recovered for use in the aforementioned solution adjustment treatment stage in which the first stage leach solution composition is adjusted preparatory to direct reduction.

A second portion of the spent liquor from the mixed sulphide precipitation stage passes to a lime boil stage in which it is treated with calcium hydroxide and steam to regenerate aqua ammonia for recycling to the solution adjustment, and optionally to the Fe-As removal, stages already described. The calcium sulphate precipitated in such lime boil stage is passed to a tailings pond.

It will be appreciated that numerous modifications and variations can be made to the process as just described without departing from the scope of the invention and that the latter is in no way restricted to the specific process flow sheet shown in the drawing. In particular, it is to be understood that impurity removal stages other than those shown may be required if impurity elements are present in the matte to an extent requiring their removal.

It is also possible to dispense with the need for a third leaching stage particularly if it is not desired to provide a final leach residue rich in precious metals as will be the case, for example, if the amounts of such precious metals in the original matte do not justify their recovery from the final leach residue. Furthermore, the second stage leaching conditions may be selected so that the nickel and copper values remaining in the second stage leach residue are so small as not to justify the use of such a third stage leach.

Specific embodiments and features of the invention are described and illustrated in greater detail in the following examples in which, unless otherwise stated, all parts and percentages are by weight.

EXAMPLE 1

The starting material for this test was a ball milled high grade nickel-copper sulphide matte derived from smelting a copper-nickel ore concentrate and having the following particle size distribution (standard Tyler screen): plus 65 mesh - 0.7 percent by weight; minus 65 mesh - 1.2 percent by weight; minus 100 mesh plus 200 mesh - 10.1 percent by weight; minus 200 mesh plus 325 mesh - 18.3 percent by weight; and minus 325 mesh - 69.7 percent by weight.

The matte had the following analysis (weight percent) nickel - 48.3; cobalt - 0.4; copper - 26.3; iron - 1.54; sulphur - 22.4; arsenic - 0.004; selenium - 0.08; bismuth - 0.003; and about 0.12 percent metals (including platinum and palladium). 11,750 grams of the matte was slurried in an agitator-equipped stainless steel autoclave with 50 liters of solution containing in solution 24.9 grams per liter (g.p.l.) nickel, 20.0 g.p.l. copper and 25.4 g.p.l. sulphur as sulphate ions and 34 g.p.l. free sulphuric acid to give a total sulphur : total molar metahs molar ratio in the slurry of 0.95.

The first stage leaching operation was carried out at a temperature of 275°F. with agitation under 20 p.s.i. oxygen overpressure for a period of 1 hour. The oxygen supply to the autoclave was then terminated and the leaching was then continued at the same temperature of 275°F. for a further period of two hours.

At the end of the non-oxidizing stage of the first leach 93.1 percent of the nickel had been extracted from the matte. The leach slurry was passed to a filter from which a first stage leach solution and a first stage leach residue were obtained. These first stage leach products had the following compositions:

|  | Leach Solution (gpl). | Leach Residue (% by weight) |
|---|---|---|
| Nickel | 106.9 | 6.9 |
| Copper | 0.003 | 69.3 |
| Iron | 2.89 | 0.29 |
| Arsenic | 0.002 | 0.0074 |
| Sulphur | 67.3 | 23.4 |

The pH of the first stage leach solution was adjusted by the addition of ammonia to a value of 4.8 and the resulting solution was sparged with oxygen at 180°F. for 60 minutes to cause the precipitation of insoluble ferric arsenate and basic ferric sulphate. After filtration to remove the precipitated material, 350 g.p.l. of ammonium sulphate and anhydrous ammonia were added to increase the pH value of the nickel solution to 7.3. The resulting slurry was then filtered and the resulting 129 liters of filtrate had the following composition (g.p.l.): Ni - 48.4; Fe - 0.001; and As - 0.0004.

98 percent of the nickel was recovered from this solution as nickel powder by hydrogen reduction at 350°F.

The first stage leach residue was passed to a second leaching stage in which it was slurried in an agitator-equipped. stainless steel autoclave with 49.5 liters of diluted sulphuric acid and leached for three hours at 275°F. under 20 p.s.i.g. oxygen overpressure. With the acid addition to the second leaching stage, the total sulphur-total metal molar ratio in the slurry was about 1.15. At the end of the specified period, 98.6 percent of the nickel and 99.3 percent of the copper had been extracted. The second stage leach slurry was filtered to give a second stage leach solution having a pH value of about 1.3 and a second stage leach residue having the following compositions:

|  | Leach Solution (gpl) | Leach Residue (Wt. %) |
|---|---|---|
| Nickel | 6.18 | 6.87 |
| Copper | 61.2 | 32.2 |
| Iron | 0.23 | 1.21 |
| Arsenic | 0.0043 | 0.12 |
| Sulphur | 42.8 | 14.3 |

The second stage leach solution was then sparged with oxygen for 30 minutes at 180°F. after the addition of ammonia to increase the pH value of the solution to 3.2. This oxidizing treatment caused the iron and arsenic contents of the solution to be lowered to 0.076 g.p.l. and 0.00025 g.p.l. respectively.

After filtration, the resulting solution which contained 8.13 g.p.l. nickel and 80.1 g.p.l. copper was passed to a copper electrowinning circuit in which 77.2 percent of the dissolved copper was recovered by electrolysis as 99.9 percent cathode copper.

The spent electrolyte from the copper electrowinning circuit and containing dissolved nickel and sulphuric acid was recycled to the first leaching stage for leaching further matte in the manner already described herein.

It will now be understood that the process of the invention is particularly advantageous in that it provides a first stage leach solution which contains a major proportion of the nickel and which is substantially completely free of copper. This consequently eliminates the need for any further treatment of the initial solution for the separation of copper therefrom. At the same time the second stage leach solution may be treated for recovery of pure copper without first removing the nickel therefrom.

EXAMPLE 2

A high grade nickel-copper sulphide matte containing 47.2 percent Ni, 1.4 percent Co, 27.0 percent Cu, 1.38 percent Fe, 22.0 percent S, 0.092 percent Pt and 0.046 percent Pd was treated in the same manner as described in Example 1 except that a third leaching stage was added for the extraction of further metal values from the second leaching stage residue.

In such third leaching stage, 165 gms of second stage leach residue were slurried in a glass-lined autoclave with sulphuric acid solution. The $H_2SO_4/Ni+\lambda$ Co+Cu+Fe molar ratio was 1.5. Leaching conditions were: 300°F, 30 p.s.i.g. oxygen overpressure and 8 hours retention time. The results are shown in the following Table I:

TABLE I

| | Composition of Residues | |
|---|---|---|
| | 2nd Stage | 3rd Stage |
| Ni | 5.4 | 0.45 |
| Co | 0.32 | 0.065 |
| Cu | 34.8 | 0.89 |
| Fe | 11.6 | 0.44 |
| S | 37.4 | 8.37 |
| Precious metals plus other insoluble impurities (by difference) | 10.48 | 89.78 |

As can be seen, such use of an additional third leaching stage is particularly desirable in the case of mattes having relatively high contents of precious metals. The precious metals remain in a high concentration in the third stage leach residue.

What we claim as new and desire to protect by Letters Patent of the United States is:

1. A continuous process for recovering and separating copper and nickel values contained in nickel-copper matte having a nickel:copper weight ratio up to about 2.5 and containing sulphur in amount less than 1 mole per mole of total acid reactive metals contained in the matte which comprises:

a. leaching finely divided particles of said matte in a first stage leach under an oxygen overpressure above about 10 psig and at a temperature above about 210°F. in an aqueous acid sulphate solution having a pH in the range of about 2.5 to about 5.0;

b. continuing said first stage leach to effect preferential extraction of a major portion of the nickel values contained in said matte while leaving a minor portion of said nickel values unextracted to provide a first stage leach solution containing a relatively high concentration of dissolved nickel and a low concentration of dissolved copper and a first stage leach residue;

c. separating said first stage leach solution from said first stage leach residue;

d. reacting said first stage leach residue in a second stage leach at a temperature above about 210°F. and under an oxygen overpressure of at least about 15 psig with an aqueous acid sulphate solution containing sufficient sulphur values to combine as sulphates with substantially all copper and nickel values contained therein to provide a second stage leach residue and a second stage leach solution containing a relatively high concentration of dissolved copper values and a relatively low concentration of dissolved nickel values;

e. recovering dissolved copper values from said second stage leach solution in a copper-winning step whilst simultaneously generating sulphuric acid to produce a spent solution containing sulphuric acid, dissolved nickel values and residual dissolved copper values; and f. recycling sufficient of said spent solution from said copper-winning step to said first stage leach to maintain the pH of the first stage leach solution within said range of about 2.5 to about 5.0 and to adjust the total sulphur content of the slurry in said first stage leach such that there is about 1 mole of sulphur in said slurry to each mole of nickel and copper.

2. A process according to claim 1 in which the first stage leach is continued to extract from 70 to 90 percent of the nickel content of the matte.

3. A process according to claim 1 in which the recycling of spent solution from the copper winning step to the first stage leach is regulated to maintain the pH in the first stage leach within the range of about 3 to 4.5.

4. A process according to claim 1 in which the first stage leach is carried on under non-oxidizing conditions for a period of time after the major portion of nickel has been extracted.

5. The process as claimed in claim 1 in which the end slurry from the first stage leach is treated with a soluble sulphide to substantially completely precipitate any residual copper therefrom.

6. A process as claimed in claim 1 in which said matte initially contains nickel and copper values in a weight ratio of from about 1:1.5 to about 1:2.0 and from about 0.5 to about 0.8 mole of sulphur per mole of nickel plus copper.

7. A process according to claim 1 wherein the first and second stage leaches are conducted at a temperature between 270°F. and about 300°F.

8. A process as claimed in claim 1 in which said matte initially includes precious metal values which precious metal values are recovered in concentrated form in said second stage leach residue.

9. A process as claimed in claim 8 which additionally comprises leaching said second stage leach residue in a third stage leach with sulphuric acid and under oxidizing conditions to extract substantially all acid soluble metals therein, separating solution from said third stage leach end slurry and recovering a third stage leach residue rich in precious metal values and essentially completely free of nickel and copper and recycling said solution to said second leaching stage.

* * * * *